United States Patent
Szeroki

(10) Patent No.: US 10,519,948 B2
(45) Date of Patent: Dec. 31, 2019

(54) METHOD OF OPERATING A PRESSURIZED DRAINAGE SYSTEM FOR WASTEWATER

(71) Applicant: WILO SE, Dortmund (DE)

(72) Inventor: Andrzej Szeroki, Bialystok (PL)

(73) Assignee: WILO SE, Dortmund (DE)

( * ) Notice: Subject to any disclaimer, the term of this patent is extended or adjusted under 35 U.S.C. 154(b) by 153 days.

(21) Appl. No.: 15/455,165

(22) Filed: Mar. 10, 2017

(65) Prior Publication Data
US 2017/0260976 A1    Sep. 14, 2017

(30) Foreign Application Priority Data

Mar. 10, 2016  (DE) .................. 10 2016 002 991
Mar. 30, 2016  (DE) .................. 10 2016 003 654

(51) Int. Cl.
| | |
|---|---|
| F04B 49/06 | (2006.01) |
| F04D 15/02 | (2006.01) |
| F04B 49/02 | (2006.01) |
| F04D 13/12 | (2006.01) |
| F04B 23/02 | (2006.01) |
| E03F 5/22 | (2006.01) |
| G05B 15/02 | (2006.01) |
| F04D 15/00 | (2006.01) |

(52) U.S. Cl.
CPC ............... *F04B 49/06* (2013.01); *E03F 5/22* (2013.01); *F04B 23/021* (2013.01); *F04B 49/02* (2013.01); *F04D 13/12* (2013.01); *F04D 15/00* (2013.01); *F04D 15/029* (2013.01); *F04D 15/0218* (2013.01); *G05B 15/02* (2013.01); *F05D 2260/607* (2013.01)

(58) Field of Classification Search
CPC ........ F04B 49/06; F04B 49/02; F04B 23/021; F04D 15/029; F04D 13/12; F04D 15/0218; F04D 15/00; E03F 5/22; G05B 15/02; F05D 2260/607
USPC ........................................................ 700/282
See application file for complete search history.

(56) References Cited

U.S. PATENT DOCUMENTS

| | | |
|---|---|---|
| 5,591,010 A | 1/1997 | Van Zyl |
| 8,594,851 B1 | 11/2013 | Smaidris |
| (Continued) | | |

*Primary Examiner* — Robert E Fennema
*Assistant Examiner* — Jigneshkumar C Patel
(74) *Attorney, Agent, or Firm* — Andrew Wilford

(57) ABSTRACT

The invention relates to a method of operating a pressurized wastewater-drainage system (1) having interconnected line sections (SA1 . . . SA9) for conducting wastewater to a transfer station (10) and a plurality of pump stations (2) connected to the line sections (SA1 . . . SA9) for collecting the wastewater, wherein at least a portion of the pump stations (2) transmits at least status information indicating its respective pump standby status to a central controller (3), wherein a group is formed from the set of pump stations (2) that are in pump standby in relation to one of the line sections (SA1 . . . SA9) such that the number of pump stations (2) of the group corresponds at least to a minimum number (p_min) of pump stations (2) associated with this line section (SA1 . . . SA9), and the pump station (2) or pump stations (2) of the group are then activated simultaneously by the central controller (3). A minimum flow rate is thus present in wide portions of the pressurized drainage system and for a maximum time, which results in a cleaning effect and thus reduces the danger of clogging.

18 Claims, 9 Drawing Sheets

(56) References Cited

U.S. PATENT DOCUMENTS

| | | |
|---|---|---|
| 2003/0066804 A1* | 4/2003 | Tipton ................... E03F 3/02 |
| | | 210/739 |
| 2010/0049781 A1* | 2/2010 | Keeni .................. H04L 41/046 |
| | | 709/202 |
| 2012/0222994 A1 | 9/2012 | Smaidris |
| 2014/0178211 A1 | 6/2014 | Nybo et al. |
| 2014/0286792 A1 | 9/2014 | Streefkerk et al. |
| 2017/0051737 A1* | 2/2017 | Ellsworth ............... F04B 51/00 |

* cited by examiner

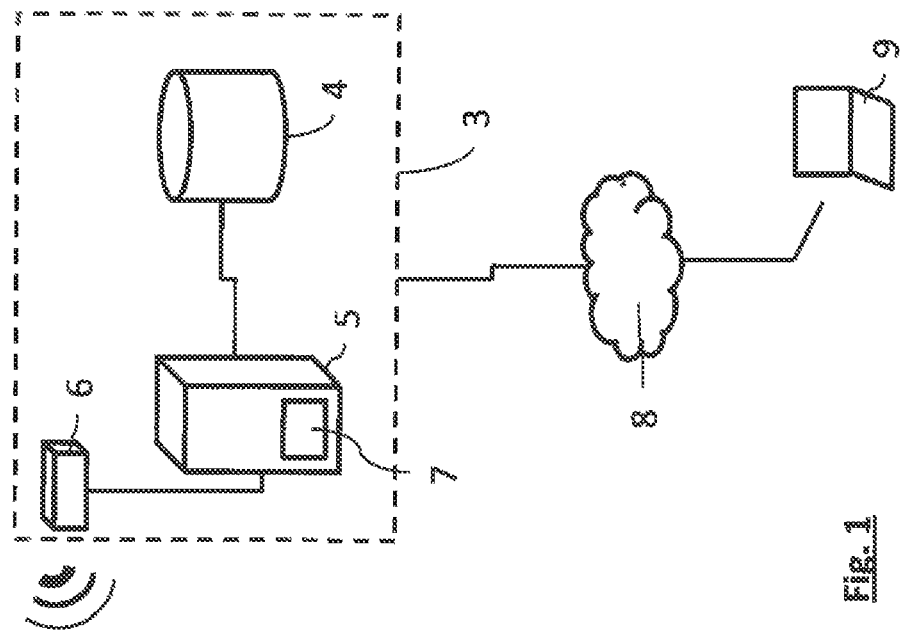
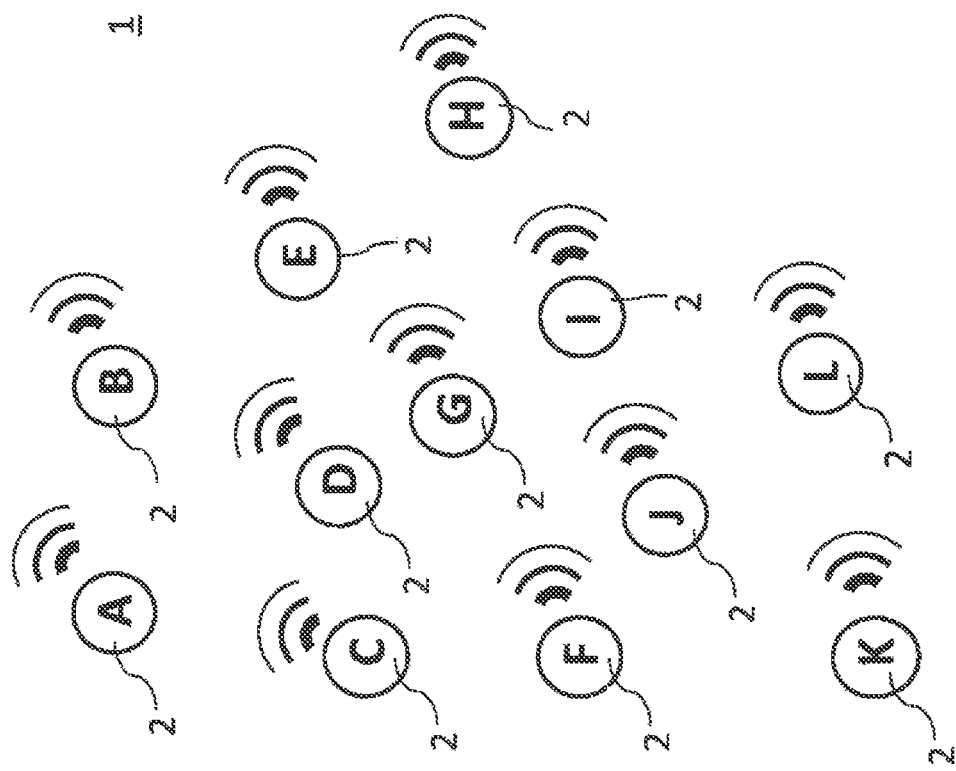
Fig. 1

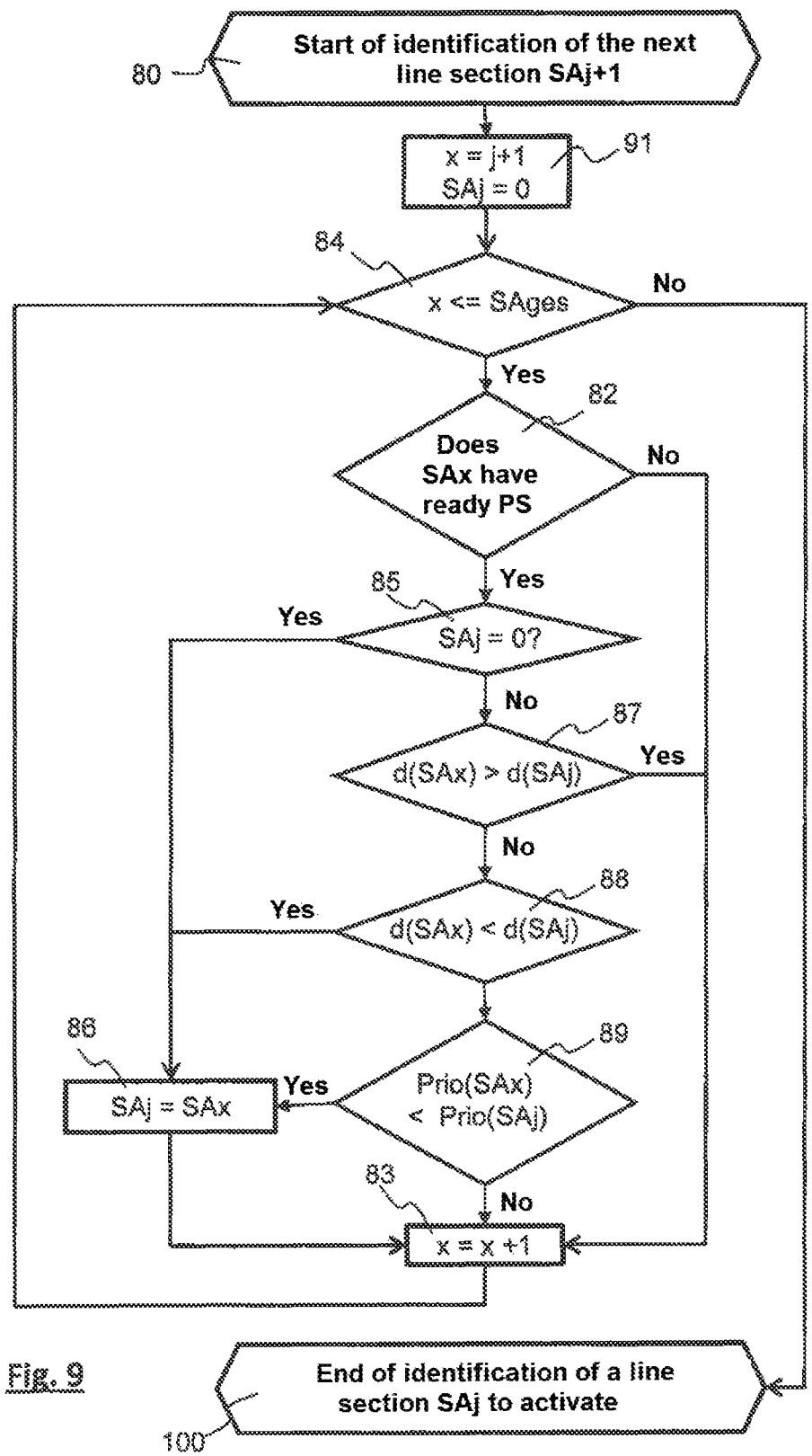

METHOD OF OPERATING A PRESSURIZED DRAINAGE SYSTEM FOR WASTEWATER

FIELD OF THE INVENTION

The invention relates to a method of operating a pressurized wastewater-drainage system having interconnected line sections for conducting wastewater to a transfer station and respective pump stations connected to the line sections for collecting the wastewater.

BACKGROUND OF THE INVENTION

Pressurized drainage systems have been known for decades and are used worldwide. Numerous applications in wastewater transport are based on this principle and can be found in the United States, Europe, Asia, and Africa. Thanks to their technological advantages, pressurized drainage systems are attractive alternatives to conventional, gravity-based wastewater transport. Pressurized drainage systems make it possible to create a wastewater infrastructure in areas in which systematic wastewater disposal is not possible, either for technical or economic reasons.

While conventional, gravity-based wastewater systems require a slope in the wastewater lines between 0.05% and 1% in order for the wastewater to flow and, for that reason, require two pump stations within a wastewater line section of one kilometer in order to lift the wastewater again to a higher level, pressurized drainage system are independent of such a slope and also do not require any interposed pump stations in order to lift the wastewater. In pressurized drainage systems, gravity is used only near the point of origin, namely in order to conduct household wastewater over a local sewage pipe from a house to a nearby wastewater collecting tank. The collecting tank, together with an internal pump, constitutes a pump station. The pump is connected by a pressure line to another wastewater pipe that is completely filled with wastewater and through which the wastewater is conveyed under pressure. The wastewater pipe can be part of an extensive hierarchical network of other wastewater pipes that lead to a central transfer station into which the pressure of the wastewater pipe network can be released. One or more of the above-mentioned pump stations can be connected to each of these wastewater pipes. During operation, they pump the collected wastewater into the wastewater pipe and "push" the wastewater already present therein forward toward the transfer station.

The collecting tanks of a wastewater pump station generally hold between 100 and 150 L. The pumps located therein, for example a displacement pump or centrifugal pump, are activated and deactivated as a function of the water level. If a certain upper threshold level is exceeded, activation occurs, and if the level falls below a lower threshold, the pump is shut off again. This occurs four times per day on average, with the total operating time being 6 minutes on average. Each operating interval of a pump station therefore has a duration of about 1.5 minutes. The pump station is therefore controlled in a decentralized manner as a function of the fill level.

However, systems are also known that use centralized control. That is the case in European patent application EP 2 746 477 [US 2014/0178211], for example. Controlling the pump stations of a wastewater system in a centralized manner definitely has advantages, but it also requires greater expenditures for planning, installation, and maintenance, since the communication from and to the pump stations must be taken into account and be reliable and inexpensive. In addition, the water level-dependent activation of the pump stations continues to be the best way to provide reliable operation in terms of preventing overflows and thus damage to the environment that ultimately also involves a liability aspect. For this reason, experts tend to not prefer centrally controlled systems.

In dimensioning the pipe diameter for wastewater systems, a hypothetical maximum inflow of wastewater that must be received from the system, or a maximum number of simultaneously pumping pump stations is assumed. In general, the wastewater system must be designed for maximum capacity. As a rule, however, the behavior of the users is not taken into account. After all, the distribution and quantity of the current inflow into the wastewater system often varies very greatly from locale to locale. In tourist areas in which the tourists leave and return to hotels and inns at different times of the day, the user behavior and hence the temporal and spatial distribution of the wastewater to be accommodated is different from that in rural areas, where the inflow of wastewater is largely dependent on the usual working hours and routines of the everyday lives of the population. For instance, the inflow varies from 1% at night to more than 10% of the total daily inflow at peak times.

Ignoring use-dependent geographic peculiarities does have the advantage, however, that the wastewater system is always reliably designed. The drawback of this approach, however, is the over-dimensioning of the pipelines in comparison to the actual needs. What is more, it must be considered that the maximum inflow only occurs about 2 to 3 hours per day, which happens to be 10% of the total operating time of the wastewater system. In other words, the pressurized drainage system only needs to convey small inflows for 90% of its operating time. This poses a substantial disadvantage in terms of the rate of flow in the pipes, particularly in over-dimensioned systems with large pipe diameters.

To prevent clogging, a necessary minimum flow rate, generally 0.7 meters per second, is assumed when planning pressurized drainage systems. It would be ideal to maintain this minimum flow rate during the entire operating time of the wastewater system. Nevertheless, it is exceeded many times during peak hours and hardly reached outside of peak hours. Consequently, clogs occur time and time again and are associated with increased maintenance costs.

OBJECT OF THE INVENTION

It is therefore an object of the present invention to improve the operation of a pressurized drainage system and to minimize the risk of clogging.

SUMMARY OF THE INVENTION

According to the invention, it is proposed that at least a portion of the pump stations each transmit status information indicating at least their pump standby status to a central controller and that, from the set of pump stations that are in pump standby in relation to one of the line sections, a group is formed such that the number of pump stations of the group corresponds at least to a minimum number of pump stations associated with this line section, with the pump station or pump stations of the group then being activated simultaneously by the central controller. In terms of the present invention, the term "group" does not necessarily mean "several pump stations." Rather, in the simplest of cases, a group can also include only one pump station, namely if a minimum number of "1" is associated with the respective line section.

The method according to the invention for operating a pressurized drainage system is thus based on a centrally controlled activation of the pump stations, of which it has a plurality. Deactivation can be done only locally as usual when a lower fill level is reached. The activation is done according to an intelligent activation schema that takes various rules into account. A core idea of the method consists in evening out the pumping operation. For instance, a situation in which unnecessarily many pump stations are pumping at the same time, thereby bringing about a volume flow into the wastewater pipes that is unnecessarily high compared to the minimum flow rate that is required, is to be prevented. Through the simultaneous pumping of many pump stations, wastewater is wasted early on that could be better used when only individual or a few pump stations have to be emptied but whose delivery volume is insufficient to reach the minimum flow rate. With the method according to the invention, it can be achieved that a certain minimum flow rate, for example 0.7 m/s, is largely present in the wastewater pipes. This minimum flow rate is sufficient to achieve self-cleaning of the lines during the operation of the pressurized drainage system. As a result, fewer clogs occur, thereby reducing maintenance costs for the system substantially.

The minimum flow rate in a line section is ensured by grouping a number of the pump stations that are in pump standby into a group that corresponds to a minimum number of pump stations for this line section. According to the invention, such a minimum number of pump stations for achieving the minimum flow rate in the corresponding line section is determined empirically for each line section of the pressurized drainage system and used for the method.

The determination of the group requires the central controller to have information on which of the pump stations are in pump standby. For this purpose, the pump stations transmit information on their pump standby status to the central controller. Standby status does not exist only when the exceeding of an upper threshold level indicates that the collecting tank is full, as in the prior art. Instead, a pump station can already be regarded as being ready to pump if it has collected at least a certain minimum quantity of wastewater, for example between 30% and 50% of its normal capacity (without reserve capacities). In the case of a pump station with a collecting tank having a 100 L nominal capacity, this means that it is already in pump standby if at least 30 L or at least 50 L have been collected.

According to one design variant, the transmission of the status information from the pump stations to the central controller can occur automatically. An event that triggers the transmission can be the reaching of a certain fill level, the reaching of a certain time, the lapsing of the next transmission interval, or the receipt of a query signal requesting that the pump stations report on their pump standby status. A combination of these events is also possible. The transmission of the status information as a result of the reaching of a certain fill level offers the advantage that the central controller need no longer analyze the information. After all, pump stations that report to the central controller as a result of exceeding a level are by definition in pump standby.

Preferably, the central controller queries the pump stations for the status information in polling intervals. The polling interval or transmission interval can be between 10 and 15 minutes. On the one hand, it should not be too long in order to prevent overflow at the pump stations and unused pumping-off of the wastewater for safety reasons. On the other hand, it should not be too short in order to enable the pumps that are already in pump standby to form and operate several groups.

If an interrogation signal is transmitted from the central controller, one possibility is for all pump stations to report to the central controller by sending information regarding whether they are in pump standby. In that case, several of the pump stations will indicate that they are ready to pump, whereas the other pump stations will indicate that they are not ready to pump. Alternatively, it is possible for only those pump stations that are in fact ready to pump to report back. This offers the advantage that the central controller also only receives information concerning pump stations that are in fact in standby, thus eliminating the need for a separate analysis as to which of the pump stations are in standby and which are not.

The status information can be binary information concerning the under- and overshooting of a certain fill level threshold, for example, it can be decimal information regarding the fill level. Furthermore, the binary and decimal information can also be transmitted together. Compared to decimal information, the use of binary information has the advantage that the information regarding pump standby status follows directly from it and the controller does not have to first check which pump stations are ready for operation and which are not. On the other hand, the fill level has the advantage that the central controller knows how high the fill level is in the pump stations independently of the fill level. This enables a dynamic selection to be made on the part of the central controller, for example, regarding the level above which a pump standby status exists. For example, if too few pump stations are ready to pump at a threshold level of 50% of the nominal capacity, the threshold level can be reduced, for example set to 30%. It can therefore be assumed that this condition is met by more pump stations than when a threshold level of 50% of the nominal capacity is used.

It is advantageous if the pump stations acknowledge their activation to the central controller. In this way, the central controller can be certain which activation was successful and in which pump station a fault may have occurred. In this case, another activation attempt can be made, for example, or a warning message can be issued by the central controller or a maintenance order issued immediately.

Preferably, the formation of groups is repeated within the polling interval or transmission interval, particularly a number of times. This means that a group is formed from the quantity of pump stations that are ready to pump, i.e. those pump stations that are in pump standby, two or more times within the polling interval or transmission interval, at least provided that sufficient pump stations are in standby and it is possible and sensible to form a group. The quantity of pump stations in standby is thus gradually worked off and the pump stations emptied.

It is expedient for a delay to occur on the part of the central controller from the activation of the pump station(s) and/or acknowledgment of this activation before the formation of groups is repeated. This offers the advantage that a second group is not formed and activated while the first group is active. After all, the wastewater flows of these two groups would overlap in a portion of the pressurized drainage system and thus bring about there a flow rate that may unnecessarily be several times greater than the minimum flow rate. Instead, the activation of a second group preferably occurs only after the pump station(s) of the first group have been emptied.

Ideally, the time required to empty the pump station(s) is taken into account in the delay. In addition, a safety buffer can be taken into account. For example, if the wastewater is pumped from the collecting tank at a delivery rate of 1 liter per second, a full collecting tank with a nominal capacity of 100 liters is emptied in 100 seconds. A collecting tank can then usually also hold a reserve capacity that can constitute up to 40% or 50% of the nominal capacity, for example. Since the activation of the pump stations does not occur directly as a function of the water level in the method according to the invention, but rather some time passes after a pump standby level is reached that can lie right at the nominal capacity, and different lengths of time pass before the various pump stations are activated, the reserve capacity may possibly be used in some pump stations. For example, an additional 40 seconds can be expected to pass before emptying in the case of a 40 liter reserve capacity. What is more, the transmission of the activation signal can take several seconds. Accordingly, selecting a delay between 150 and 180 seconds for a 100 liter wastewater collecting tank of a pump station represents a conservative approach.

The number of repetitions can preferably correspond to the greatest multiple of the delay that is less than the polling interval or transmission interval. For example, if the polling interval or transmission interval is 10 minutes, in the case of a delay of 3 minutes, a maximum of three groups can be formed, and if the polling or transmission interval is 15 minutes, up to five groups can be formed. Each attempt to form a group is referred to hereinafter as a cycle.

In order to exploit the polling or transmission interval in the best possible manner, a provision can also be made that the pump stations provide an acknowledgment to the central controller regarding the ending of the pumping operation. This offers the advantage that, if the central controller identifies that all of the previously activated pump stations have ended their activity, the next group formation or next cycle can be initiated before the delay period has lapsed. The delay therefore need not necessarily be a fixed amount of time. In this way, the number of repetitions of the group formation in the polling or transmission interval can be maximized.

The polling and/or transmitting of status information and the provision of an acknowledgment and/or feedback regarding the ending of a pumping operation can be done by radio, preferably using a mobile communications network such as GSM (Global System for Mobile Communication), for example according to the GPRS (General Packet Radio Service) standard. This offers the advantage that no communication lines need to be laid parallel to the wastewater pipes and the pump stations need not be connected locally to a MAN (Metropolitan Area Network, for example a telephone network) or a WAN (Wide Area Network). Ideally, all of the communication between the central controller and the pump station occurs by radio.

For the second and every subsequent cycle, it is advantageous if the activated pump stations are eliminated from the set of pump stations in standby. The data held in the central controller are thus updated, so that the same pump station is not incorrectly placed into a group twice. The elimination of the pump station from the set of pump stations in standby can be performed immediately after transmission of the activation signal, upon receipt of the acknowledgment, but preferably after lapsing of the delay or upon receipt of feedback regarding ending of the pumping operation.

At least one table can be used to form the group in which the correlations of the pump stations to the line sections and the minimum number for each line section are stored. This table or these tables is/are then analyzed during each cycle and can be searched for the needed correlations. Preferably, the correlations of the pump stations to the line sections are stored in a first table. The correlation of the minimum numbers to the line sections can follow from a second table that shows a minimum number of pump stations associated with each diameter of a line section. The diameter of the wastewater pipe forming the line section is then stored in the first table for each line section and then forms the link between the two tables. The first table can represent a network table that illustrates the topology of the specific pressurized drainage system. The second table can be table that can be used for different pressurized drainage systems and contain universal and/or empirically determined data such as the minimum number of pumps required to achieve the minimum flow rate for various pipe diameters, for example.

Preferably, the table or at least one of the tables also contains a maximum number of pump stations for each of the line sections. This is also used during the formation of groups. What is taken into account with the maximum number is that, in the case of several pump stations that are pumping simultaneously, their overall delivery rate is greater than the delivery rate that can be conducted through the connected wastewater pipe; the pump stations located downstream are working against the wastewater that is already flowing in the line section. This problem can be illustrated with the image that an overcrowded freeway can no longer accommodate cars that are waiting at the on-ramps. A maximum number of simultaneously active pump stations that should not be exceeded when forming groups can thus be correlated with each pressurized water line based on its respective diameter and the resulting maximum throughput. Especially energy-efficient operation can thus be achieved.

In order to form a group, the line section to which at least one pump station is assigned and that has the smallest diameter in comparison to the other line sections can be identified. The group is formed from pump stations that are associated with this line section. This does not mean, however, that the group must consist only of pump stations associated with this line section. As will become even clearer further below, a combination of pump stations that goes beyond the line sections can also be formed into a group.

The search for the smallest-diameter line section is preferably always performed, that is, whenever a group is formed. What this ultimately means is that the method always begins with the pump stations that are ready to pump and are remotest from the transfer station. These are emptied first. After all, the pipe diameter in the network of wastewater pipes becomes greater as it nears the corresponding line section at the transfer station. This ensures that the minimum flow rate and hence the cleaning effect is achieved over wide portions of the line network.

In the case of line sections having the same diameter in a pressurized drainage system, a line priority can be assigned to each of these line sections that is taken into account during the formation of a group. When forming a group, if several line sections have the identical smallest diameter, that line section to which the highest line priority is assigned is used. The group is formed only or at least from pump stations that are associated with this highest-priority line section.

Furthermore, if more than two pump stations are connected to the same line section, it is advantageous if a pump priority is assigned to each pump station. This makes it possible to order the pump stations of the same line section hierarchically. Preferably, the pump priority can be assigned for every pump station, even for those that are connected to only one line section. If more pump stations in pump standby are associated with the identified line section than the maximum number indicates or allows, the group can then be formed from only those pump stations having the highest priorities. For example, if four pump stations in standby are present even though the maximum number of the corresponding line section is three, only the pump stations having the priorities one, two and three are grouped together. The pump station with priority four is not considered.

The pump priority can be assigned such that a pump station of a line section has a greater priority the farther away it lies at the beginning of the respective line section toward flow. This also makes it possible for those pump stations to be activated first whose lifted wastewater travels the farthest to the transfer station, so that a cleaning effect is achieved in extensive line sections of the pressurized drainage system.

Preferably, the respective line priority can be associated with each of the line sections and/or the respective pump priority associated with each of the pump stations and stored in the table or at least one of the tables. The central controller can thus form the group in a simple manner by analyzing the priorities in the table or tables.

According to an advantageous development of the method according to the invention, if fewer pump stations in standby are associated with the identified line section than the minimum number indicates, the group can, on the one hand, be formed from the pump station(s) of the identified line section that are in standby and, on the other hand, be formed from one or more pump stations of at least one line section upstream from the identified line section that are in standby such that the minimum number of the identified line section is reached or even exceeded. This combination of pump stations from multiple line sections into a group optimally utilizes the quantity of pump stations that are ready to pump in order to achieve a cleaning effect. Even though the pump station in the upstream line section is not sufficient to achieve the minimum flow rate (otherwise, they would have already been emptied during the or one of the previous cycles), this pump station does, however, bring about an increase in the flow rate in the identified line section, so that the minimum flow rate is achieved in that particular line section.

In order to ensure the greatest possible level of reliability in the inventive operating method, a decentralized, fill level-dependent control is superordinate to the activation of the pump stations by the central controller. This means that, once a certain fill level is reached, the pump stations are switched on independently of the activation by the central controller. This fill level can be characterized, for example, by the sum of nominal capacity and reserve capacity. After all, although a pump station can still accommodate an emergency volume upon reaching this fill level until it overflows, how fast the emergency capacity is filled up depends on the inflow into these pump stations. In order to prevent overflow, emergency activation then occurs at the determined fill level.

In the event of emergency activation, it is expedient if the corresponding pump station notifies the central controller of this activation, so that the central controller can update its data and change the status of these pump stations to unavailable. This prevents these pump stations from being taken into account during the next group formations.

BRIEF DESCRIPTION OF THE DRAWING

Additional features and advantages of the method according to the invention are explained below on the basis of exemplary embodiments and the enclosed figures.

FIG. 1 is a conceptual representation of the system design of a pressurized drainage system according to the invention;

FIG. 9 is a flowchart for the identification of the next line section.

SPECIFIC DESCRIPTION

Figure 2:
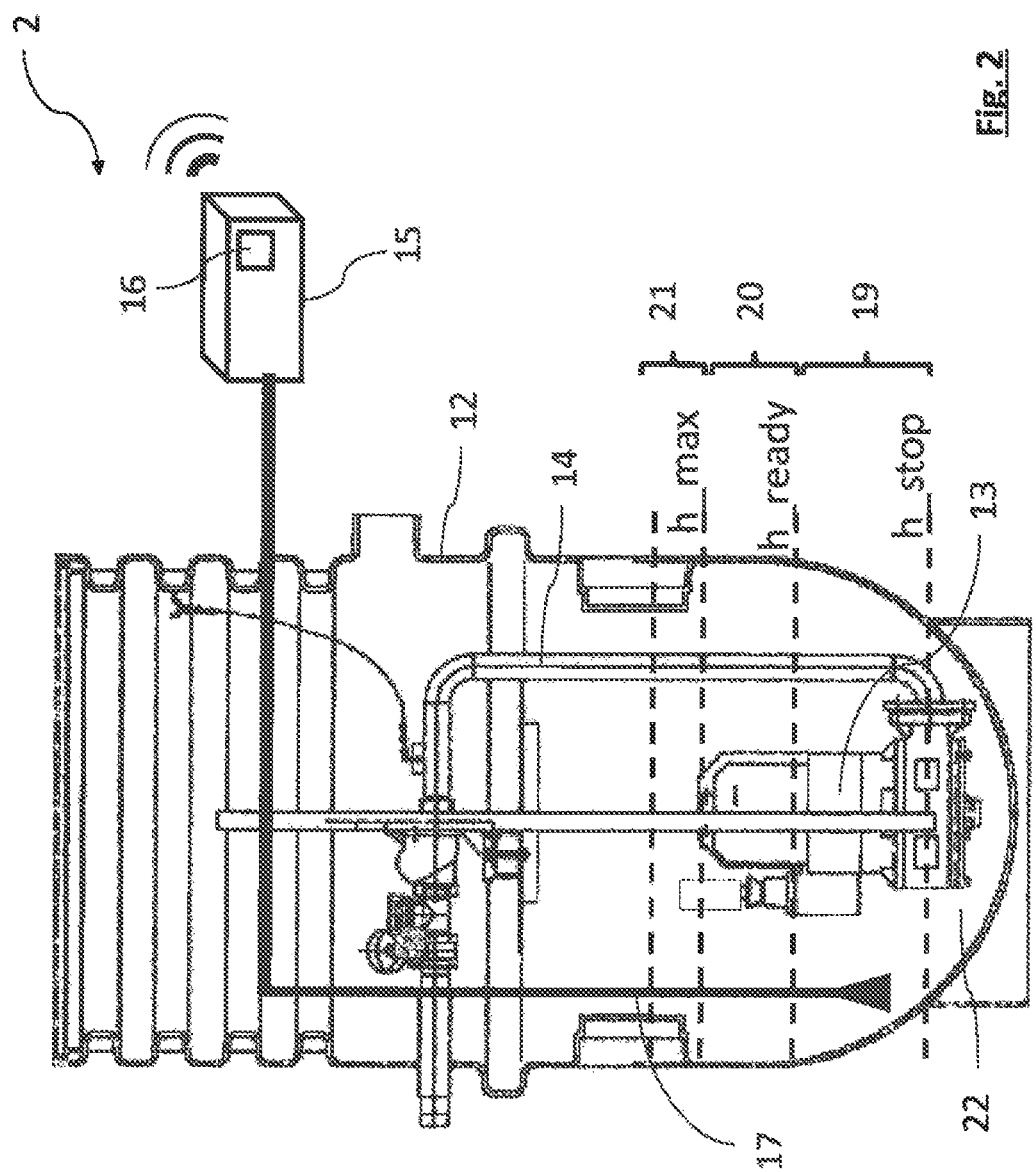
FIG. 2 is a schematic representation of a pump station.

FIG. 1 is a basic illustration of a pressurized wastewater-drainage system, with only a plurality of pump stations 2, which are designated by the letters A to L, as well as the centralized communication structure, being depicted. The pump stations 2 are in radio communication with a central controller 3. The central controller 3 is connected here for the sake of example via a network 8, for example by internet, to a computer unit 9. From this computer unit 9, the central controller 3 can be monitored, configured, and/or controlled. For this purpose, the controller 3 can provide a web-based interface by means of a web server that can then be displayed on the computer unit 9.

The central controller 3 comprises a processing unit 5, for example a computer system or a microprocessor system, to which a data memory 4 is connected. It should be noted that the data memory can be connected directly in one design variant and indirectly in another design variant to the processing unit 5, for example via a network such as the internet. For instance, the data memory can be located in the cloud. A logic unit 7 for analyzing the data in the data memory 4 runs on the processing unit 5. A transceiver unit 6 by means of which the radio communication to the pump stations 2 occurs is also connected to the processing unit 5. Alternatively, the transceiver unit 6 can also be implemented in the form of two separate units, namely a transmitter unit on the one hand and a receiver unit on the other.

FIG. 2 is an exemplary representation of a pump station 2 that can be used as pump station A . . . L. The pump station comprises a container 12 for collecting the wastewater as well as a pump 13, for example a displacement pump or a centrifugal pump, that is in the lower region of the container 12 and presses the wastewater over a pressure line 14 into a wastewater pipe (not shown) during operation. The container 12 has a nominal capacity 19 of 100 liters, for example. In the conventional 2-point control according to the prior art, the pump 13 is activated as soon as the nominal capacity is filled with wastewater. This is the case once the fill level reaches the first threshold level h_ready. As a result of the lifting of the wastewater, the fill level falls, and the pump 13 is deactivated again when the fill level reaches a lower threshold level h_stop.

Below this lower threshold level h_stop, the pump 13 draws air, so that it cannot continue to be operated in any event. As a result, a dead zone 22 lies below the lower threshold level h_stop from which the wastewater cannot be pumped out using the pump 13. A reserve capacity 20 that comprises 40 liters, for example, begins above the first threshold level h_ready. Once this reserve capacity has been filled, the container 12 has a fill level that is designated by a second threshold level h_max. If this second threshold level is also exceeded, the container 12 can still accommodate an emergency capacity 21 until overflow occurs.

A level sensor 17 is in the container in order to measure the fill level and is connected via a corresponding measuring line to a local control 15 provided outside of the container 12. This pump control 15 is also connected to the pump 13 in order to control it, particularly to activate and deactivate it. The pump control 15 comprises a local transceiver unit 16 in order to receive communication from the central transceiver unit 6 on the one hand and to transmit communication to same on the other hand.

Figure 3:
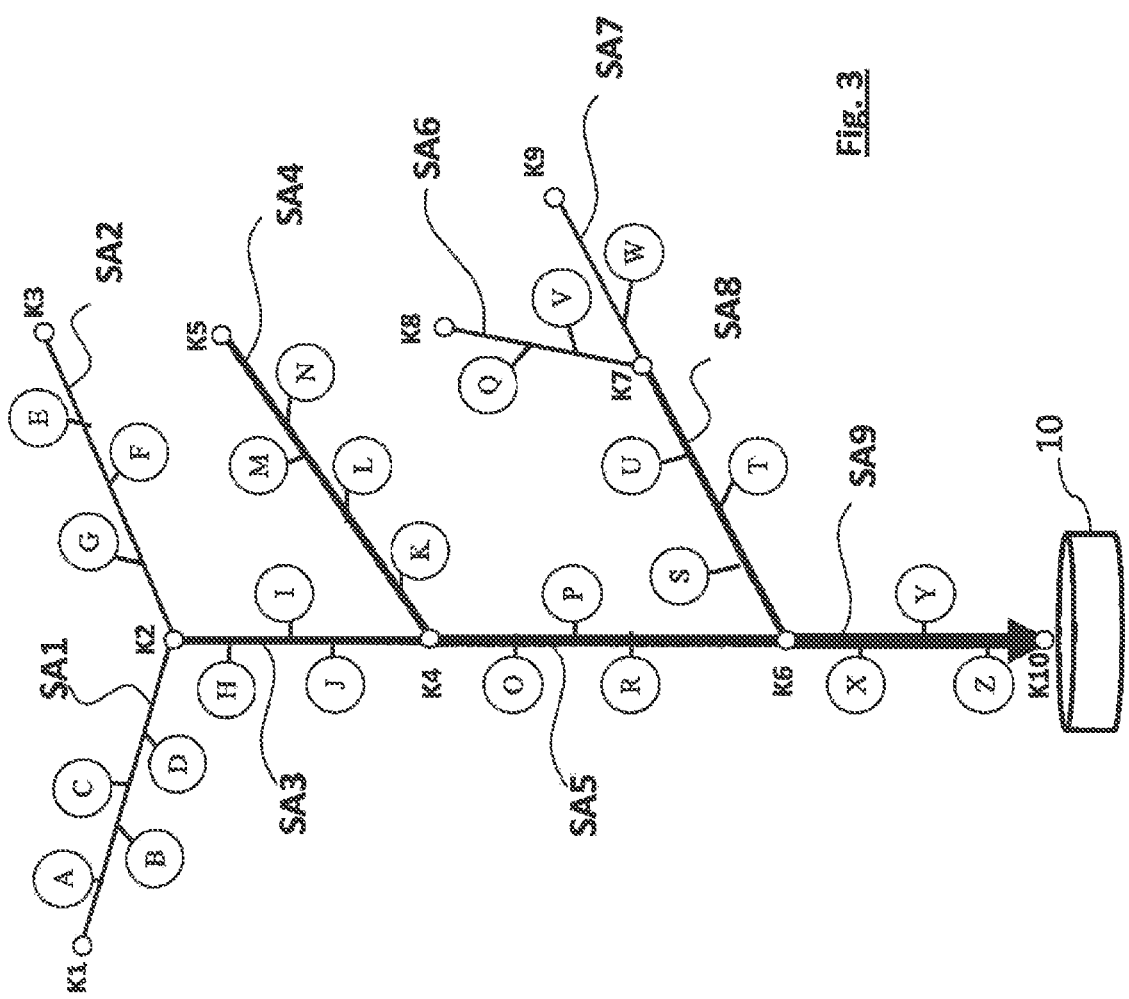
FIG. 3 shows the network topology of a first exemplary pressurized drainage system.

FIG. 3 shows the topology of an exemplary network of wastewater pipes of the pressurized drainage system 1 with 26 pump stations 2 that are designated by the letters A to Z. The network consists of a total of nine line sections that are interconnected and designated by SA1 to SA9. Each line section SA1 to SA9 extends between a starting point and an endpoint located downstream that together form the common nodes K1 to K10 of the network.

In the network shown in FIG. 3, for example, a first line section SA1 and a second line section SA2 merge at a node K2 into a third line section SA3. The latter transitions at a node K4, at which inflow from a fourth line section SA4 also occurs, into a fifth line section SA5. And the latter, in turn, transitions at a node K6, at which inflow from an eighth line section SA8 also occurs, into a ninth line section SA9. The eighth line section SA8, in turn, begins at a node K7, at which a sixth and a seventh line section SA6, SA7 merge.

The line sections SA1 to SA9 are shown in FIG. 3 with different line thicknesses that indicate different types of wastewater pipe and/or diameters. Based on its diameter, each type of wastewater pipe has a certain minimum volumetric flow rate Q that must be reached, as well as a minimum flow rate v_mind=0.7 m/s that must be reached. Depending on the type of pump within a pump station 2, this minimum volumetric flow rate, and hence the minimum flow rate is reached with (or only with) a certain number of pumps of the corresponding pump type.

These data that are universally applicable to any pressurized drainage system, are summarized in Table 1.

TABLE 1

| Wastewater pipe type/diameter | Q [m³/h] to reach v_mind [m/s] zu | Number of pumps type 1 | | Number of pumps type 2 | |
|---|---|---|---|---|---|
| | | p_min | p_max | p_min | p_max |
| d1 | Q1 = 1.49 | 1 | 1 | — | — |
| d2 | Q2 = 2.48 | 1 | 1 | — | — |
| d3 | Q3 = 3.86 | 2 | 2 | 1 | 1 |
| d4 | Q4 = 6.16 | 3 | 3 | 1 | 2 |
| d5 | Q5 = 8.72 | 4 | 5 | 2 | 3 |
| d6 | Q6 = 12.60 | 6 | 8 | 3 | 4 |
| d7 | Q7 = 18.77 | 9 | 10 | 4 | 5 |
| d8 | Q8 = 24.29 | 11 | 17 | 5 | 6 |
| d9 | Q9 = 39.78 | 18 | 18 | 7 | 8 |

Table 1 lists the nine different diameters d1 to d9. There, the diameters refer, for example, to d1=32 cm, d2=40 cm, d3=50 cm, d4=63 cm, d5=75 cm, d6=90 cm, d7=110 cm, d8=125 cm, d9=160 cm. It can be seen from Table 1 that, in the case of a wastewater pipe having a diameter d1 and a wastewater pipe having a diameter d2, one respective pump station is sufficient in order to reach the minimum volumetric flow rate. Starting at diameter d3, however, more pump stations are required: at d3:2, at d4:3, at d5:4, at d6:6, at d7:9, etc. This information is needed in the inventive method described in the following. How many pump stations are required in order to reach the minimum volumetric flow rate and hence the minimum flow rate is shown in Table 1 for each diameter d1 to d9 as p_min.

In addition, Table 1 also shows a maximum number of pump stations for each diameter d1 to d9 as p_max. The minimum number p_min and the maximum number p_max can be identical for small-diameter wastewater pipes. That is the case, for example, for diameters d1 to d4.

The essential aspects of the topology of the network according to FIG. 3 are shown in Table 2 that is broken down into complementary sub-tables 2a and 2b. This Table 2 shows line sections SA1 to SA9, whose pipe diameters and the pump stations A to Z associated with them.

TABLE 2a

| Line Section | Diameter | Section Priority | Line-section Groups | Member pump stations | Pump Priority | Level h_ist | Pump ready h_ist> h_ready |
|---|---|---|---|---|---|---|---|
| SA1 | d4 | 1 | — | A | 1 | hA | Yes/No |
| | | | | B | 2 | hB | Yes/No |
| | | | | C | 3 | hC | Yes/No |
| | | | | D | 4 | hD | Yes/No |
| SA2 | d4 | 2 | — | E | 1 | hE | Yes/No |
| | | | | F | 2 | hF | Yes/No |
| | | | | G | 3 | hG | Yes/No |
| SA3 | d5 | 2 | — | H | 1 | hH | Yes/No |
| | | | | I | 2 | hI | Yes/No |
| | | | | J | 3 | hJ | Yes/No |
| SA4 | d5 | 2 | — | N | 1 | hK | Yes/No |
| | | | | M | 2 | hL | Yes/No |
| | | | | K | 3 | hN | Yes/No |
| | | | | L | 4 | hN | Yes/No |
| SA5 | d6 | 1 | SA3, SA4 | O | 1 | hO | Yes/No |
| | | | | P | 2 | hP | Yes/No |
| | | | | R | 3 | hQ | Yes/No |

TABLE 2b

| Line Section | Diameter | Section Priority | Line-section Groups | Member pump stations | Pump Priority | Level h_ist | Pump ready h_ist> h_ready |
|---|---|---|---|---|---|---|---|
| SA6 | d4 | 3 | — | Q | 1 | hR | Yes/No |
| | | | | V | 2 | hS | Yes/No |
| SA7 | d4 | 4 | — | W | 1 | hT | Yes/No |
| SA8 | d5 | 3 | — | U | 1 | hU | Yes/No |
| | | | | Y | 2 | hV | Yes/No |
| | | | | S | 3 | hW | Yes/No |
| SA9 | d5 | 1 | SA3, SA4 SA5, SA8 | X | 1 | hX | Yes/No |
| | | | | Y | 2 | hY | Yes/No |
| | | | | Z | 3 | hZ | Yes/No |

In order to carry out the exemplary embodiment of the method according to the invention described below, priorities are assigned to the pump stations A to Z and the line sections SA1 to SA9. The pump priorities are distributed in relation to a line section. The pump stations of the same line section therefore have different priorities.

The assigning of pump priorities is done here according to the position of the pump station within a line section. The farther the respective pump station at the beginning of the line section, the greater its priority. In FIG. 3, in the case of the first line section SA1, with which the four pump stations A, B, C, D are associated, pump station A has pump priority 1, pump station B has pump priority 2, pump station C has pump priority 3, and pump station D has pump priority 4. The bright priorities are assigned to the other pump stations E to Z in like manner.

The assigning of the line priorities is basically only necessary for those line sections that have identical diameters; in the interest in being systematic, however, every line section is assigned a line priority. If a line section has a diameter that occurs only once on the network, that line section is assigned the highest priority "1." In the exemplary network in FIG. 3, the first, second, sixth, and seventh line sections SA1, SA2, SA6, SA7 have the same diameter d4. During assigning of the line priorities, those line sections that are farther from the transfer station are provided with a higher priority. For this reason, the first and the second line sections SA1, SA2 are assigned a higher priority than the sixth and the seventh line sections SA6, SA7. However, the first and second line sections SA1, SA2 are topologically equivalent, so that a choice can be made here which line section receives the higher priority. The same applies to the sixth and the seventh line sections SA6, SA7.

During the assigning of the line priorities, it is taken into account for the third and fourth line sections SA3, SA4 that the third line section SA3 is connected to at least one preceding line section, continuing a main line, as it were. It is for this reason that the third line section SA3 is assigned a higher priority than the fourth line section SA4 that forms a secondary line. The eighth line section SA8, which also has the same diameter as the third and fourth line section SA3, SA4, is assigned the lowest priority because it, more specifically its endpoint K6, lies nearest the transfer station 10.

Both the pump priorities and the line priorities are shown in Table 2 and can therefore be checked by the central controller 3, more particularly by its logic unit 7.

Figure 5:
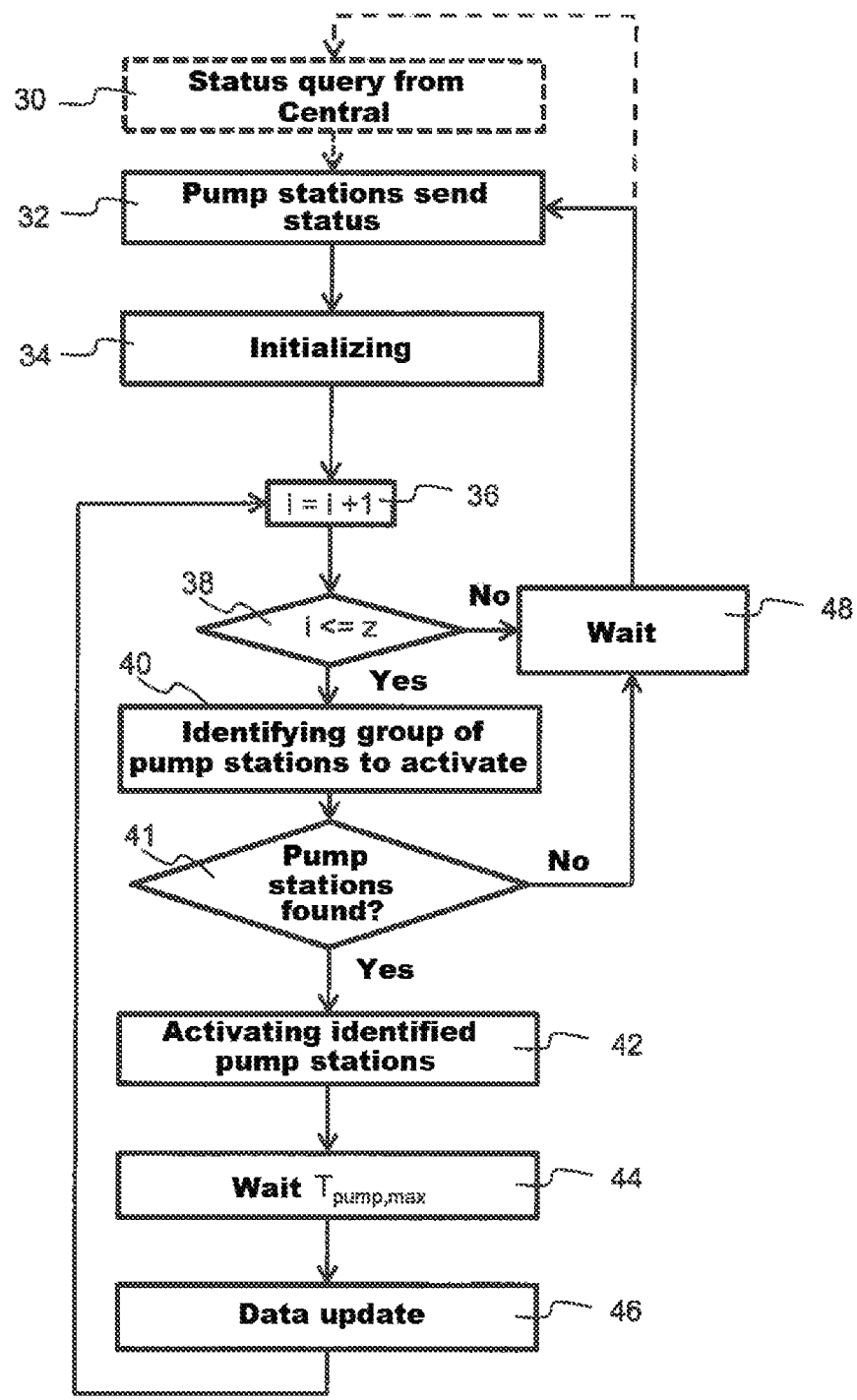
FIG. 5 is a diagram of the superordinate method sequence.

FIG. 5 shows the general process sequence of the method according to the invention. At the beginning of the method, the pump stations 2 transmit information on their pump status to the central controller 3. In the simplest case, this is binary information to the effect that the corresponding pump station 2 is ready to pump. This means that a certain fill level, for example the first upper threshold level h_ready, has been reached or exceeded. The transmission of the status information is shown in block 32. In one design variant, the transmission can occur automatically from the pump stations 2, for example in transmission intervals of 10 minutes. According to another design variant, the transmission of the status information can be triggered by a corresponding status query that is addressed by the central controller 3 to the pump stations 2, for example in polling intervals of 10 minutes. In FIG. 5, this is shown in block 30 that is upstream from block 32. In one design variant, all of the pump stations 2 can react to this status query, or only those that are in fact in pump standby.

As a result of the transmission of the information regarding the pump statuses of the pump stations 2, the central controller 3 knows which of the pump stations 2 can and cannot be activated. The information on the respective pump status is stored in the data memory 4, particularly in Table 2 so as to be correlated with the respective pump stations. This is contained in block 34 "Initialization," which is followed by the initialization of different variables for the execution of the rest of the method. For example, a first counting variable I is given the value 0 here.

This counting variable is increased by 1 in the next step (block 36). It indicates that a first cycle is beginning. Here, a cycle means that a group of pump stations is being activated. In each ensuing cycle, another group is then activated by pump stations. A provision is made that several cycles are carried out within a transmission interval or polling interval. Since a cycle requires a certain amount of time, however, the total duration of the cycles must not exceed the duration of a transmission interval or polling interval. A maximum number z of cycles is therefore provided that cannot be exceeded. This is queried in block 38. In one exemplary embodiment, z=3. Once the maximum number z is reached, nothing further need be done for the time being. It is then waited (block 48), until the next transmission interval or polling interval begins, i.e. in one design variant the pump station 2 transmits its pump status information again or, in another design variant, the transmission of this information is requested by the central controller 3.

If the maximum number z has not yet been reached, the core procedure of the method occurs, namely the identification of a group of pump stations 2 to be activated (block 40). If this inquiry yields pump stations to be activated, which is asked in block 41, then these identified pump stations are activated (block 42). A time Tpump,max is then waited until the pump stations 2 have been emptied with certainty (block 44). For example, the waiting time can be 3 minutes. A data update then occurs (block 46), and the pump status of the previously activated pump stations stored in the data memory 4, more particularly in Table 2, is updated, particularly changed to "not ready to pump."

The control variable i is then incremented, and the next cycle is carried out (block 36). The method steps named in blocks 38-46 are then repeated. If the query in block 41 reveals that no pump stations were found during the group identification, then the method is ended here for the time being. It then begins again with the next transmission interval or polling interval, i.e. in one design variant the pump station 2 transmits its pump status information again or, in another design variant, the transmission of this information is requested by the central controller 3.

Figure 6:
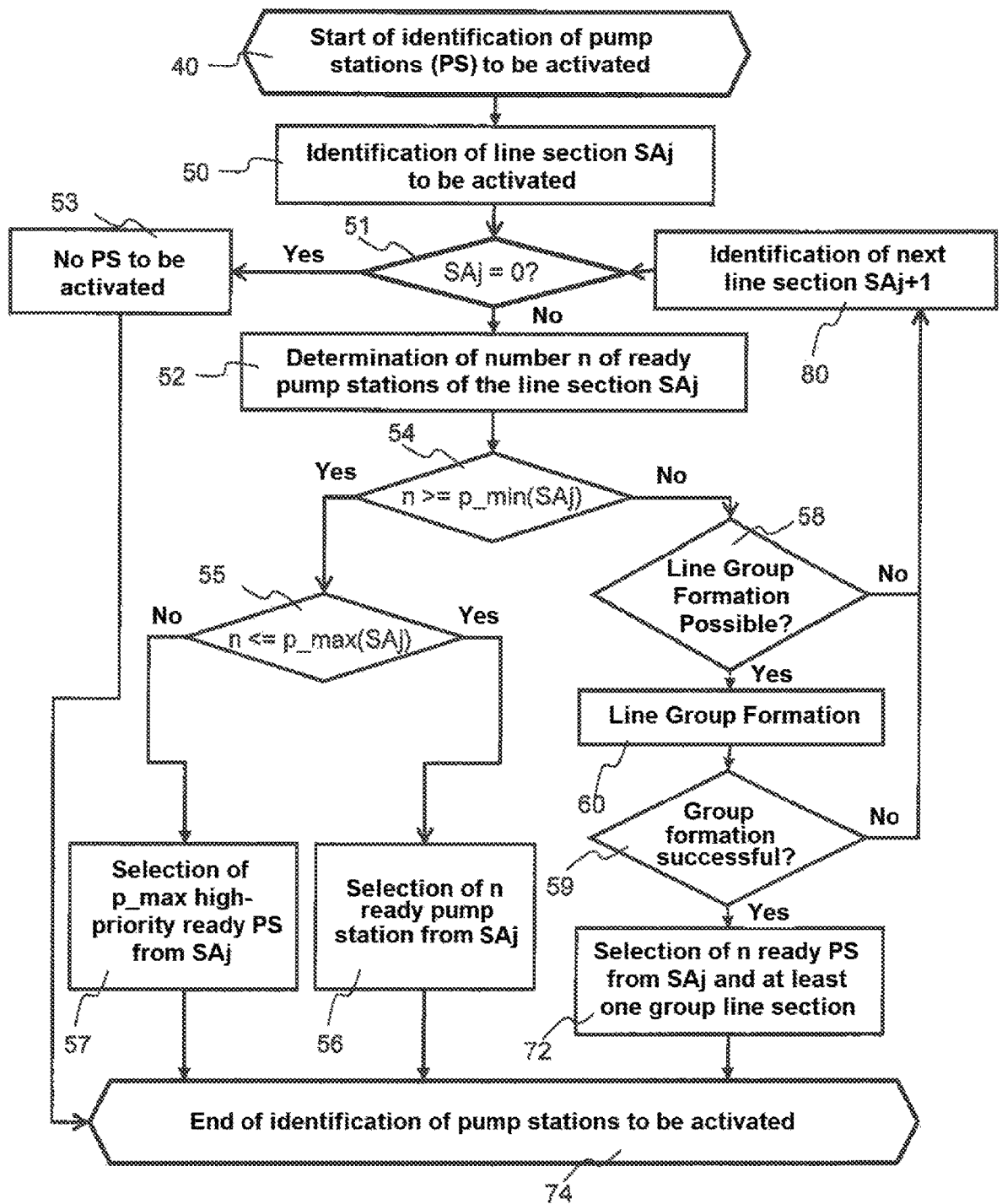
FIG. 6 is a flowchart for the identification of the pump stations to be activated.

FIG. 6 illustrates an exemplary process sequence for identifying the group of pump stations 2 to be activated within a cycle, thus implementing block 40. In order to form the group from the quantity of pump stations 2 in standby, a certain line section SAj is first identified with which the pump stations 2 that are in standby are correlated. This inquiry occurs in block 50 and is designated with "Identification of a line section SAj to be activated."

This inquiry will be explained with reference to FIG. 7.

If the line section inquiry has yielded a corresponding line section SAj (SAj≠0, query in block 51), the number n of pump stations 2 that are in standby and connected to this line section SAj is then determined (block 52). On the other hand, if the inquiry has not yielded any line section SAj (SAj≠0), no (more) pump stations 2 can be activated (block 53) and sub-procedure 40 is ended. The method is then continued in block 41 in FIG. 5, upon which the waiting for the new pump status information follows.

The number n of identified pump stations 2 is first compared to the minimum number p_min (SAj) of pump stations 2 required for the identified line section SAj (block 54). This minimum number p_min follows from the combination of the information in Tables 2 and 1. While Table 2 shows which diameter d1 to d9 the identified line section SAj has, Table 1 indicates for the corresponding diameter d1 to d9 how many pump stations are necessary in order to achieve the minimum volumetric flow rate.

If the inquiry in block 54 reveals that enough pump stations 2 in standby are present on the identified line section SAj, it is then investigated whether all of these pump stations 2 in standby can be activated or the total number n of pump stations in standby exceeds the maximum number p_max (Saj) of pump stations 2 associated with the identified line section SAj (block 55). This maximum number p_max also follows from the combination of Tables 2 and 1, specifically from the diameter according to Table 2 correlated with the identified line section SAj in conjunction with the maximum number p_max associated with this diameter in Table 1. This number should not be exceeded, so that one or more pump stations do not work against the pressure that has built up from one or another pump station.

If the total number n is not greater than the maximum number, all pump stations 2 of the identified line section SAj that are in standby are selected for activation (block 56), and the method continues to step 41 in FIG. 5.

If the total number n is greater than the maximum number, only a number of the pump stations 2 of the identified line section SAj that are in standby corresponding to the maximum number p_max are selected. This is done on the basis of the pump priority in Table 2. Those pump stations 2 having the highest priority are selected for activation (block 57). It should be noted that the priority becomes greater the smaller the numerical value indicating the parameter "priority" is.

In the case of p_max=2 pump stations 2 to be selected from n=3 selectable pump stations 2, the pump stations with priorities 1 and 2 are therefore chosen. The method then continues with step 41 in FIG. 5.

If the query in block 54 reveals that the number n of pump stations 2 of the identified line section SAj that are in standby is sufficient to achieve the minimum flow rate (n<p_min), step 58 checks whether the identified line section SAj might optionally be combined with one or more line sections located upstream toward flow of the network. This is referred to as line group formation.

Group line sections (GSA) with a certain line section SA1 to SA9 are defined like the priorities before the beginning of the process and can be stored in the network table, Table 2. Group line sections are line sections of the network in which the activation of a connected pump stations 2 results in an increase in the flow rate in one of the subsequent line sections toward the transfer station 10.

In the case of the exemplary network according to FIG. 3, the third and fourth line section SA3, SA4 are direct group line sections of the fifth line section; see Table 2a. Furthermore, the fifth and eighth line section SA5, SA8 are direct group line sections of the ninth line section SA9. Since the fifth line section SA5 also has group lines, however, its group line sections are also indirect group line sections of the ninth line section SA9. SA9 therefore has line sections SA3, SA4, SA5, and SA8 as group line sections; cf. Table 2b.

The query as to whether a line group formation is possible is made in step 58. This query can be answered using Table 2, it being checked here whether at least one group line section is associated with the identified line section SAj. If this is not the case, a next line section is identified in block 80, the procedure of which is shown in FIG. 9 and will be explained below. However, if a group line section is associated with the identified line section SAj, the line group formation is performed in step 60, that is, the attempt is made to combine pump stations 2 of the identified line section SAj with pump stations 2 of the group line section(s). The line group formation is explained below with reference to FIG. 8. An inquiry is made in step 59 as to whether this was successful. If not, a next line section is identified as described previously (block 80). If so, then the pump stations 2 that are associated with the identified line section SAj on the one hand and the pump stations 2 of at least one of the group line sections of the identified line section SAj that are in standby on the other hand are selected for activation (block 72). The method then continues with step 41 in FIG. 5.

Figure 7:
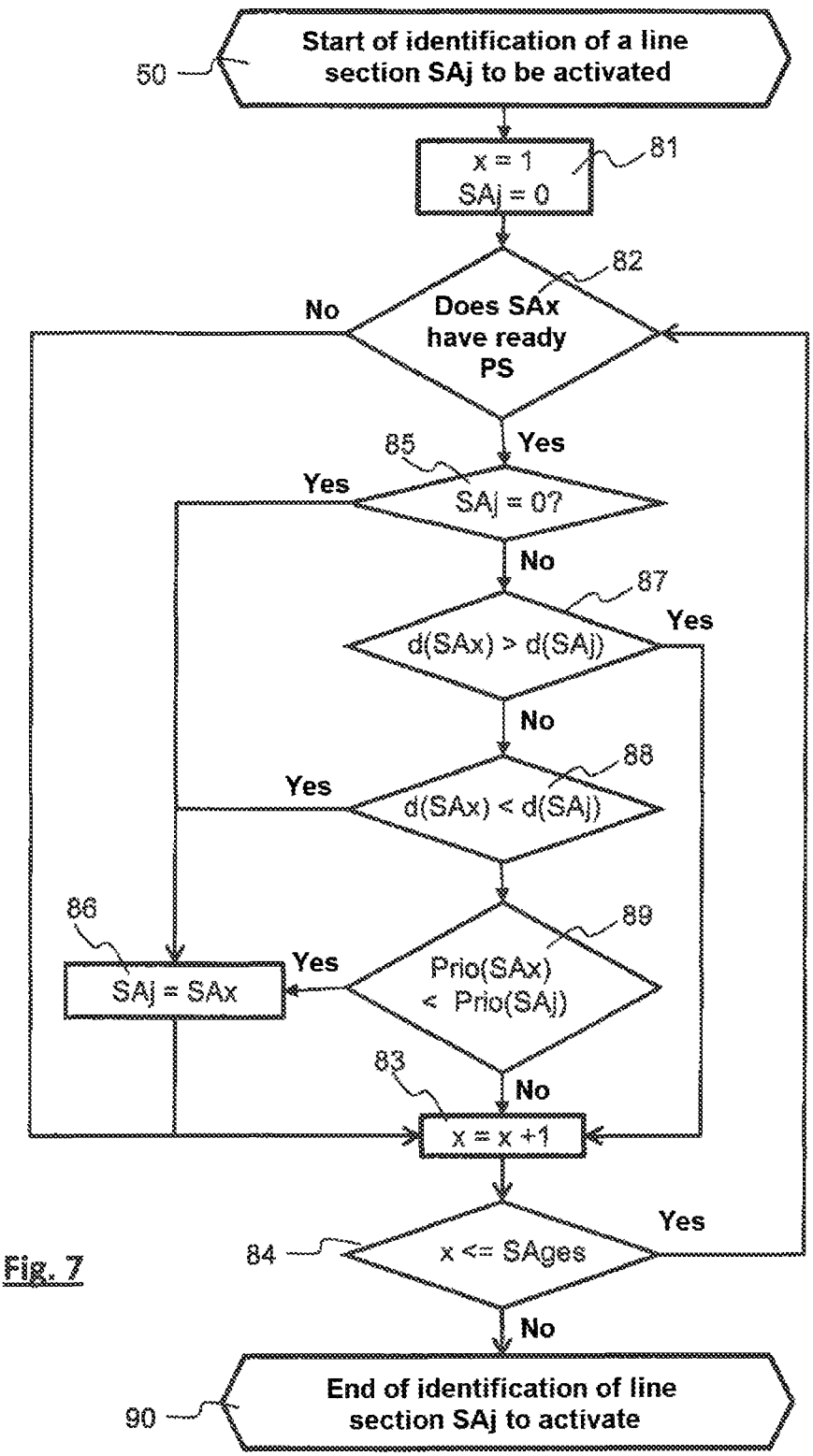
FIG. 7 is a flowchart for the identification of a line section.

FIG. 7 shows an exemplary process sequence for the identification of a line section SAj to be activated. There are essentially two variants for the line section identification. On the one hand, the starting point can be the line sections SA1 to SA9, which are checked successively for the presence of pump stations 2 in standby, the smallest diameter, and the highest priority. Alternatively, the starting point can be the number of pump stations 2 in standby for which it is successively checked with which line section they are associated, which of these line sections has the smallest diameter, and which of them, in turn, has the highest priority. FIG. 7 shows the 1st variant of the method that implements block 50 in FIG. 6.

The line section identification begins with the initialization in step 81, in which a control variable x with the value 1 identifying a line section and a parameter SAj that identifies an identified line section, are preset with the value 0. In step 82, it is first inquired whether the xth line section SAx has pump stations 2 in standby. At the beginning of the method, it is of course the first line section SA1 that is checked. If no pump stations 2 that are in standby are associated with this xth line section, the control variable x is incremented by one in step 83, and the next line section SAx+1 is checked insofar as the total number SAmax of line sections SA1 to SA9 has not yet been reached (block 84). If the total number SAges has been reached the line section identification process ends after block 84. The method then continues in step 51 of FIG. 6.

If the check performed in step 82 reveals that the xth line section SAx has pump stations 2 in standby, it is checked in step 85 whether a line section SAx has already been noted previously as a potential candidate. In this case, the parameter SAj would be different from 0. If there is still no candidate, SAj=0, then the xth line section SAx is noted in step 86 as a potential candidate in the parameter SAj. The control variable x is subsequently incremented again, and the next line section SAx+1 is checked. If this one also has pump stations 2 in standby, it is now checked, since there is already a potential candidate for the line section SAj to be identified, whether this next line section SAx+1 is a better candidate than the one that was identified previously. For this purpose, it is first checked in step 87 whether the diameter d)SAx) of the new potential candidate SAx is larger than the diameter d(SAj) of the previously identified candidate SAj. If this is the case, the new potential candidate SAx cannot be a better candidate, because the line section with the smallest diameter should always be identified. The control variable x is then incremented again, and the next line section SAx+2 is checked.

However, if the check in step 87 reveals that the diameter d(SAx) is not larger, it is either smaller or of equal size. If the diameter d(SAx) is smaller (step 88), the potential new candidate SAx is indeed a candidate and is written into the parameter SAj. If the diameter d(SAx) is not smaller, and consequently of equal size, the line priorities are compared with one another in step 89.

If the line priority Prio(SAx) of the potential new candidate SAx is higher than the line priority Prio(SAj) of the candidate SAj already found, then the new potential candidate SAx is a better candidate and is written into the parameter SAj (block 86), and the next line section is checked (blocks 83, 82). If the priority is not higher, the control variable x is incremented again, and the next line section is checked. Here, too, it should be noted that the priority becomes greater the smaller the numerical value indicating the parameter "priority" is. The line section identification process is ended as soon as it is determined in block 84 that all line sections SA1 to SA9 have been checked. The method then continues with step 51 in FIG. 6.

An exemplary process sequence for identifying the next line section SAj+1 according to block 80 in FIG. 6 is shown in FIG. 9. The process differs only slightly from the process shown in FIG. 7 for identifying a line section SAj to be activated. Process blocks in which the same steps are carried out in both line section identification processes are designated by the same reference numbers. One difference during the identification of the next line section according to block 80 is that the start value of control variable x is the index value j of the previously identified line section SAj increased by 1. After all, the previous line section identification according to block 50, if it were carried out again instead of block 80, would again yield the same line section SAj that was identified before, because nothing has changed in the pump standby statuses of the pump stations. For this reason, the line section identification according to FIG. 9 begins with the next line section SAj+1 that follows the previously identified line section SAj.

It must first be checked whether the total number SAges of line sections has already been exceeded (block 84). In comparison to the procedure in FIG. 7, block 84 is therefore provided upstream from block 82. It is only when the check in block 84 shows that the total number SAges of line sections has not yet been exceeded that steps 82, 83, 85, 86, 87, 88, and 89 are carried out analogously to the line section identification according to block 50 in FIG. 7. If the total number SAges of line sections has been exceeded, no next line section was able to be identified and the parameter SAj remains at 0, so that it is subsequently determined in step 51 that no pump stations to be activated were able to be found. This determination in block 41 of FIG. 5 then leads to a termination of the current cycle without the starting of a new cycle. The method is then continued with the calling-up or transfer of new/current pump status information.

Figure 8:
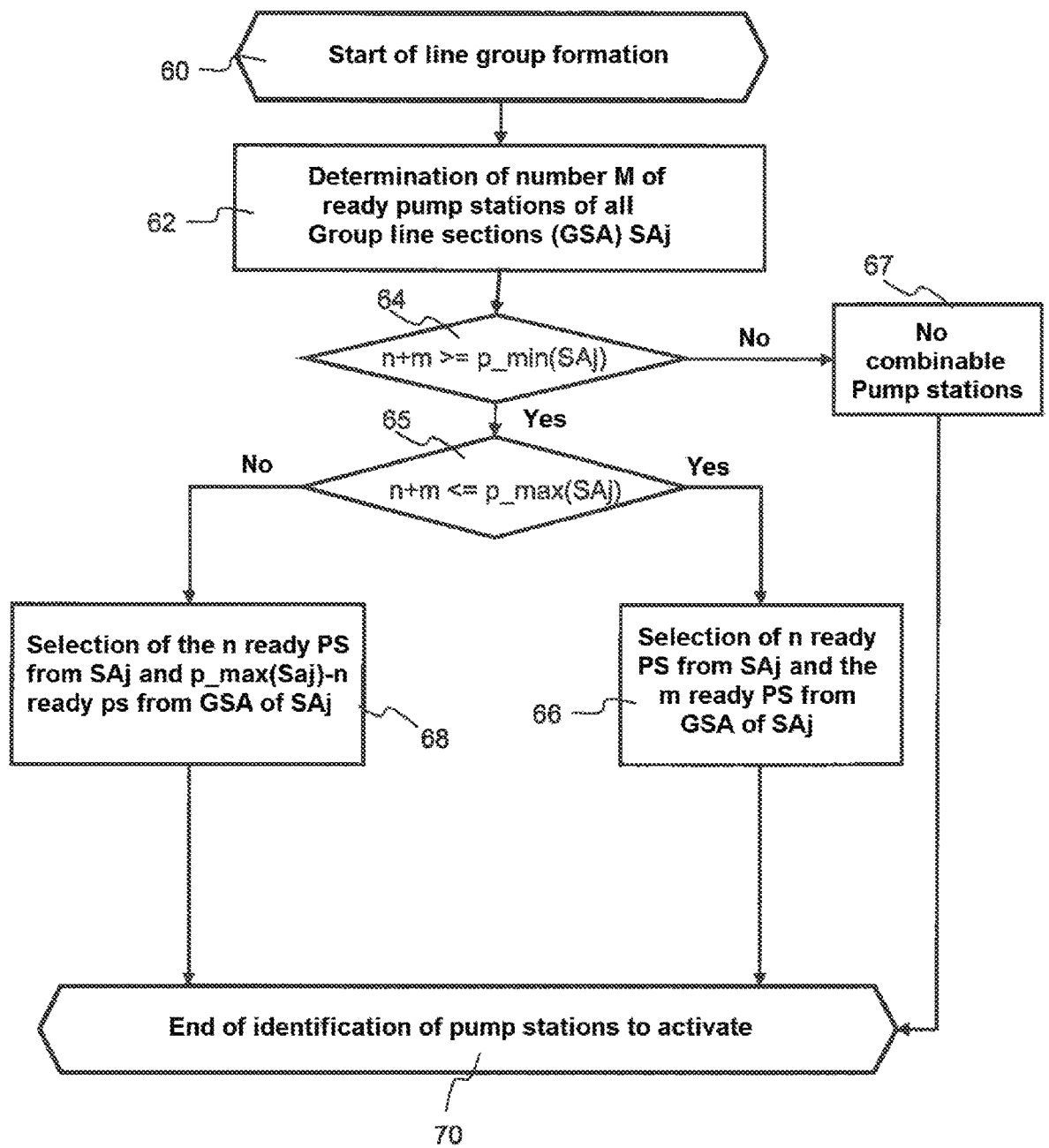
FIG. 8 is a flowchart for the line group formation.

The line group formation according to block 60 in FIG. 6 will now be described with reference to FIG. 8. At the beginning, it is determined in step 62 how many pump stations 2 are in pump standby in the group line sections GSA that are associated with the identified line section SAj. This is expressed in the number m. If the sum of the pump stations 2 of the identified line section SAj and its group line sections that are in standby does not reach the minimum number p_min(SAj) of pump stations 2 that is required for the identified line section SAj (see block 64), then the formation of group line is ended, since no pump stations 2 were able to be combined (blocks 67, 70). The method then continues with step 59 in FIG. 6.

If the minimum number p_min(SAj) is reached, a check is then performed in step 65 to see whether the sum of the pump stations 2 of the identified line section SAj and its group line sections that are in standby exceeds the maximum number p_max(SAj) of pump stations 2. If this is not the case, all of the pump stations 2 of the identified line section SAj and its group line sections that are in standby can be selected for activation in a group, step 66.

Insofar as the maximum number p_max(SAj) of pump stations 2 is exceeded, however, a number p_max-n of certain pump stations must be selected from among the quantity m of pump stations 2 of the group line sections that are in standby. This can be done on the basis of the pump priorities and the line priorities. Those p_max-n pump stations 2 of the group line sections are selected that have the highest priorities. If two or more pump stations of different group line sections have the same pump priority, then the pump station 2 is selected that is associated with the group line section having the higher line priority. For example, if p_max-n::3 pump stations 2 have to be selected from among two group line sections having the same diameter and each with 2 pump stations in standby, the two pump stations with priority 1 of the two respective group line section and the pump station with priority 2 of the group line section having priority 1 are selected. The pump station with priority 2 of the other group line section and the two pump stations with priority 3 are not selected. According to this procedure, the n pump stations 2 of the identified line section SAj that are in standby and the number p_max(SAj)–n of pump stations of the group line sections of the identified line section SAj that are in standby are selected in step 68 for activation as a group. The line group formation 60 is ended at this point (block 70), and the method continues in step 59 in FIG. 6.

Figure 4:
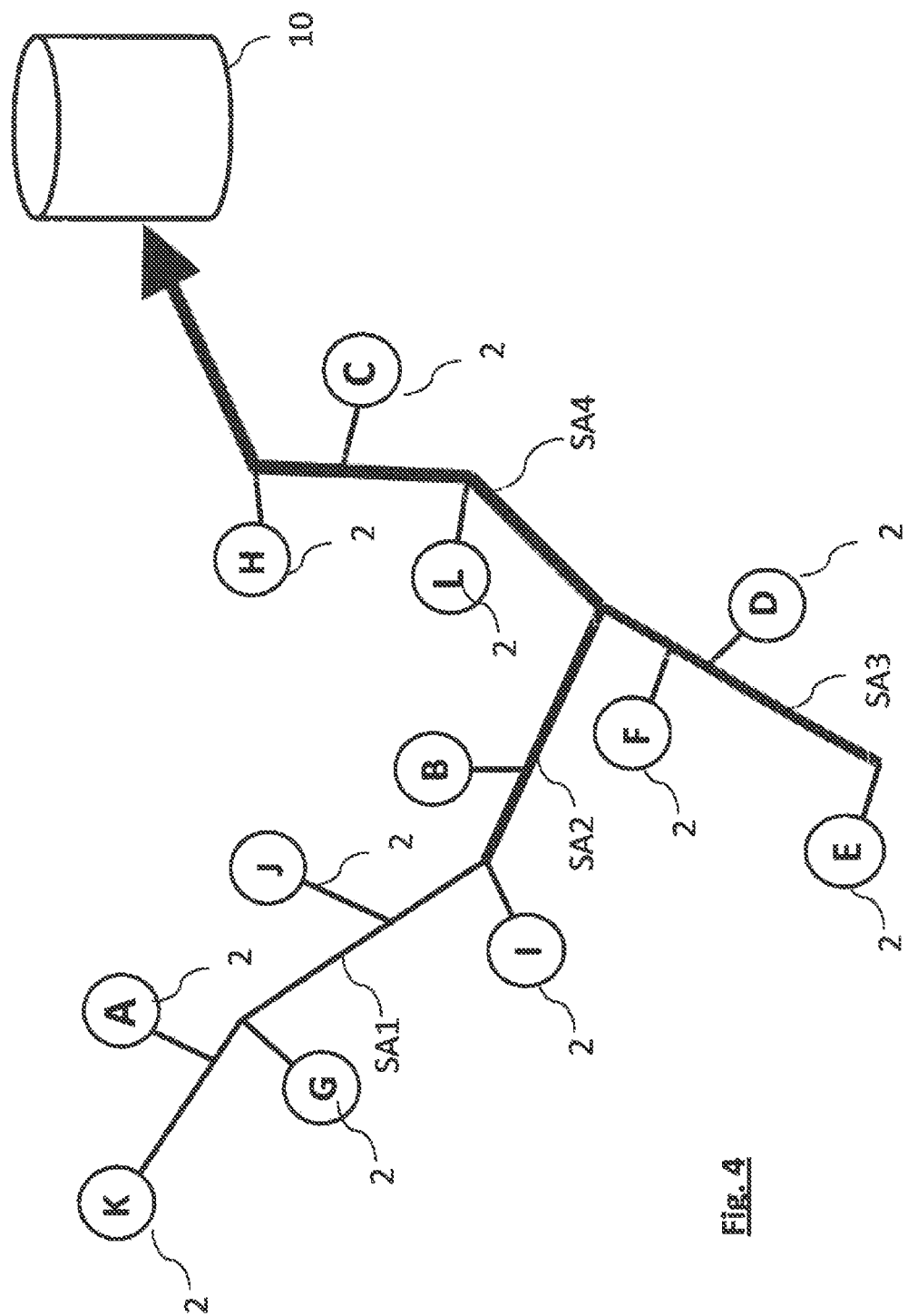
FIG. 4 shows the network topology of a second exemplary pressurized drainage system.

The method according to the invention will now be illustrated on the basis of three examples that take the network topology according to FIG. 4 into account.

The wastewater pipe network according to FIG. 4 comprises line sections SA1 to SA4. The four pump stations A, G, J, and K are connected to the first line section SA1. The two pump stations I and B are connected to the second line section SA2 adjacent thereto. A third line section SA3 comprises the three pump stations D, E, and F and merges together with the second line section SA2 into a fourth line section SA4, to which the three pump stations C, H, and L are connected. The fourth line section has the largest pipe diameter. The line sections SA2 and SA3 have a smaller but identical pipe diameter. Finally, the first line section has the smallest pipe diameter. Table 3 shows the network topology in table form. All of the pump stations of the pressurized drainage system according to FIG. 4 have displacement pumps, i.e. pumps of type 2 according to Table 1.

TABLE 3

| Line Section | Diameter | Section Priority | Line-section Groups | Member pump stations | Pump Priority | Level nd h_ist | Pump ready h_ist> h_ready |
|---|---|---|---|---|---|---|---|
| SA1 | d4 | 1 | — | A | 2 | hA | Yes/No |
|  |  |  |  | G | 3 | hG | Yes/No |
|  |  |  |  | J | 4 | hJ | Yes/No |
|  |  |  |  | K | 1 | hK | Yes/No |
| SA2 | d5 | 1 | — | I | 1 | hI | Yes/No |
|  |  |  |  | B | 2 | hB | Yes/No |
| SA3 | d5 | 2 | — | D | 2 | hD | Yes/No |
|  |  |  |  | E | 1 | hF | Yes/No |
|  |  |  |  | F | 3 | hF | Yes/No |
| SA4 | d6 | 1 | SA2, SA3 | C | 2 | C | Yes/No |
|  |  |  |  | H | 3 | H | Yes/No |
|  |  |  |  | L | 1 | I | Yes/No |

The line priority "1" is assigned to the first, second, and fourth line sections SA1, SA2, SA4, respectively. Only the third line section has a lower priority since its pipe diameter is identical to that of the second line section. The second line section has the higher priority in comparison to the third line section here, since it is part of a main line that is formed by the first, second, and third line section SA1, SA2, SA4. The second and third line section SA2, SA3 each form a group line section of the fourth line section SA4.

According to its arrangement within the first line section SA1, the pump station K has the highest priority because it is at the beginning of the first line section SA1. The pump stations A, G, and J can then be found downstream, so that pump station A has the priority 2 accordingly, pump station G the priority 3 accordingly, and pump station J the priority 4 accordingly. According to the sequence of their arrangement toward flow on the respective line section SA1 to SA4, corresponding priorities are assigned to the other pump stations I, B, D, E, F, C, H, and L. Both the pump priorities and the line priorities as well as the group line correlations are contained in Table 3.

We will now turn our attention to a first example that involves a pump situation after the transmission of the pump status information (block 32 in FIG. 5), that is as follows: The three pump stations K, B, H are ready for pumping. The other pump stations are not ready for pumping.

The first cycle, steps 34, 36, 38, as well as the identification of a group of pump stations to be activated (block 40) now begins. This, in turn, begins with the identification of a line section to be activated (block 50). The first line section SA1 is identified first, since it has the pump station K that is in standby. The first line section SA1 is written into the parameter SAj as a potential candidate. The second line section SA2 is then checked. Since it includes the pump stations B that are in standby, it is considered first as a potential new candidate. However, since the pipe diameter d(SA2) of the second line section SA2 is larger than the pipe diameter d(SAj) of the first line section SA1, the query in block 87 is positive, and the third line section is checked. However, that has no pump station that is ready for pumping, so the fourth line section is immediately checked next. While the fourth line section has pump station H that is in standby, it has a larger diameter d(SA4) than the first line section d(SAj), so the query is positive in block 87 in this case, too, and the control variable x is incremented to the value 5. This results in the termination of the line section identification in block 84, with the identified line section SAj being the first line section SA1.

The number n of pump stations in standby of this line section SA1 is then determined according to step 52. Since only pump station K is ready for pumping, the number is n=1. As can be seen in Table 3, the diameter of the first line section SA1 is the diameter d4. According to Table 1, only one pump station is needed for this diameter (p_min(d4)=1) in order to reach the minimum flow rate of 0.7 m/s. The query in block 54 is therefore positive. The query in block 55 is also positive, since the maximum number p_max(d4) of pump stations for diameter d4 is equal to 2. Pump station K is therefore selected according to block 56 as a pump station to be activated. It is then activated in block 42. This is followed by a 3-minute wait, and then pump station K is eliminated from the set of pump stations that are in standby.

Then the second cycle begins. The second line section SA2 then follows from the line section identification (block 50), since it has pump stations B that are in standby, and has a smaller diameter than the fourth line section SA4. However, the query in step 54 indicates that the number n of pump stations n−1 in standby is less than the minimum number p_min of pump stations. After all, according to Table 1, it is two for diameter d5. No line group formation is possible, since the second line section SA2 according to Table 3 has not assigned any group line sections. From block 58, the next line section SAj+1 is therefore then identified according to block 80.

This next line section is SA4 (x=j+1, j=3; block 81), because it is the only one that still has a pump station that is in standby, namely pump station H, and there is no other line section having a larger diameter. Here, too, however, the number of pumps required for the diameter d6 of the fourth line section SA4, that, according to Table 1, is p_min (d6)=3, is not reached. While line group formation is possible for the fourth line group formation SA4, the sum of all pump stations of the fourth line section SA4 and its group line sections SA2 and SA3 that are in standby only amounts to two, so even a combination of pump stations that extends beyond one line section does not reach the required minimum number p_min (d6) of pump stations. The query in block 64 is therefore negative, as is the query in block 59, so that the identification of the next line section SAj+1 is carried out again (block 80). However, this immediately reveals in block 84 that the total number of line sections SAges has been exceeded, so that the next line section SAj cannot be identified. Since the parameter SAj is zero as a result of its initialization in block 81, it follows from block 51 that no pump stations to be activated were able to be found; see block 53. This then leads to a negative result in block 41, and it is then waited until the next polling interval starts or new status information is available.

Consequently, only one cycle is carried out completely as a whole in the observed polling interval. In that cycle, a "group" consisting of only one pump station was activated. Of the pump stations K, B, and H that were in standby, only pump station K was emptied. Pump stations B and H are pending emptying in the next cycle, provided that they are not activated by the superimposed local pump control 15. Locally controlled activation would be the case if the fill level rises to the second upper threshold level h_max (see FIG. 2), i.e. the reserve capacity is completely exhausted.

The next querying of pump statuses according to step 30 in FIG. 5 is performed after lapsing of the polling interval that is 10 minutes since the last query in this example. As a second example, it will now be assumed that, in addition to the pump stations B and H that are still in standby, pump stations G, I, E, and D also report with status information that they are in standby. Consequently, seven pump stations are now ready for pumping: B, H, G, I, E, D. This situation results in the following activation sequence: G; I+B; E+D, so that five stations in standby have been emptied in three cycles at the end of the polling interval. Pump station H is left over.

As in the first example, during the line section identification in block 50, the first line section SA1 is selected, since it has a pump stations that is in standby, namely pump stations associated with it, and it has the smallest pipe diameter d4 in the network. Also as in the previous example, it is then determined in block 54 that the minimum number p_min (d4) of pump stations that are in standby has been reached for the first line section and the maximum number of pump stations has also not been exceeded. After all, only the one pump station G is present that is in standby, and the minimum number p_min (d4) is one according to Table 1 and the maximum number p_max(d4) is two. Consequently, the pump station G is activated in steps 2 and 40. Only this pump station forms the "group" identified in step 40. There is a 3-minute wait in step 44 in order to ensure that the pump station G is completely emptied if other pump stations are being activated. Pump station G is then eliminated from the set of pump stations that are in standby, i.e. that are designated as not being ready for pumping in Table 3.

The control variable i is then incremented in step 36, and the second cycle begins. The pump stations B, H, I, E, D are now also ready for pumping. The line section identification in block 50 now identifies the second line section SA2, because the first line section SA1 no longer has any pump stations in standby because it has the smallest diameter among the possible line sections SA2, SA3, SA4 and because it has the higher priority in comparison to the third line section SA3 that has the same diameter d5. Step 52 yields the number n=2 of pump stations that are in standby for the identified line section SAj=SA2. According to Table 1, the minimum number p_min (d5) of pump stations for the diameter d5 is two, and the maximum number p_max(d5) is three. The minimum number p_min (d5) for the identified line section SAj=SA2 is thus reached (step 54), and the maximum number p_max(d5) is not exceeded. Therefore, according to step 56, the two pump stations I and B that are in standby are selected as a group and then activated together in step 42. There is then another 3-minute wait, and the pump stations I and B are marked in Table 3 as being no longer ready for pumping. The second cycle is thus also ended.

The control variable i is again incremented in step 36, and the third, still-possible cycle (since z=3) begins. The pump stations H, E, D are now also ready for pumping. The line section identification process in block 50 now identifies the third line section SA3, because the first and second line sections SA1, SA2 no longer have any pump stations in standby, and because it has the smallest diameter d5 among the possible line sections SA3, SA4. The method is now identical to the previous cycle, since two pump stations are present that are in standby, at least two pump stations are required to reach the minimum throughput, and the maximum number of pump stations p_max(d5)=3 is not exceeded. Therefore, according to step 56, the two pump stations E and D that are in standby are selected as a group and then activated together in step 42. There is then another 3-minute wait, and the pump stations E and D are marked in Table 3 as being no longer ready for pumping. The third cycle is thus also ended. A fourth cycle is no longer possible, because that would extend beyond the polling interval.

As a third example, we will now consider the pump situation in the next polling interval that all twelve pump stations A, B, C, D, E, F, G, H, I, J, K, L are in standby. Such a case can occur, for example, if no pump stations were able to be emptied due to a power outage and all of the pump stations are full as a result. The method according to the invention results in the following activation sequence: K+A; G+J; I+B. Pump stations D, E, F as well as L, C, and A are left over.

The first line section SA1 is identified in the first cycle. The number n=4 exceeds the permitted maximum number p_max(d4)=2 (block 55). The two highest-priority pump stations K and A of the first line section SA1 are therefore selected and activated as a group. In the second cycle, the first line section SA1 is identified again, since it still includes pump stations G and J. It is determined in block 55 that the maximum number has not been exceeded, so that these two pump stations G and J are selected. The third cycle that now follows is identical to the second cycle of the second example, so that the pump stations I and B are activated. The method thus ends, and pump stations D, E, F as well as L, C, and A are left over.

The invention claimed is:

1. A method of operating a pressurized wastewater-drainage system having interconnected line sections for conducting wastewater to a transfer station and a plurality of pump stations connected to the line sections for collecting the wastewater, the method comprising the steps of:
   transmitting, from each of the pump stations filled to more than a predetermined level, status information indicating the respective pump is in standby status to a central controller,
   forming a group from a set of pump stations that are in pump standby in relation to one of the line sections when the number of pump stations of the group corresponds at least to a minimum number of pump stations associated with this line section, and
   then simultaneously activating the pump station or pump stations of the group by the central controller for cleaning the respective line section.

2. The method defined in claim 1, further comprising the step, in polling intervals, of:
   the central controller querying the pump stations for status information, or transmitting the status information automatically in transmission intervals.

3. The method defined in claim 2, wherein the formation of a group from the set of pump stations that are in pump standby is repeated within the polling interval or transmission interval a certain number of times.

4. The method defined in claim 2, wherein the querying or transmission of the status information or the acknowledgment occurs via a mobile communications network.

5. The method defined in claim 1, wherein the status information is binary information concerning the under- and overshooting of a certain fill level threshold or decimal information concerning the fill level.

6. The method defined in claim 1, further comprising the step of:
   the pump stations acknowledging their activation to the central controller.

7. The method defined in claim 1, further comprising the step of:
   eliminating the activated pump stations from the set of pump stations that are in standby.

8. The method defined in claim 1, further comprising the steps of:
   using at least one table to form the group in which the correlation of the pump stations to the line sections, and
   storing the minimum number for each line section in the table.

9. The method defined in claim 8, further comprising the step of:
   storing a maximum number of pump stations in the table or at least one of the tables for each of the line sections.

10. The method defined in claim 1, wherein a decentralized, fill level-dependent control is superordinate to the activation of the pump stations by the central controller.

11. A method of operating a pressurized wastewater-drainage system having interconnected line sections for conducting wastewater to a transfer station and a plurality of pump stations connected to the line sections for collecting the wastewater, the method comprising the steps of:
   transmitting from at least a portion of the pump stations status information indicating its respective pump standby status to a central controller,
   forming a group from a set of pump stations that are in pump standby in relation to one of the line sections such that the number of pump stations of the group corresponds at least to a minimum number of pump stations associated with this line section, repeating the formation of a group from the set of pump stations that are in standby within a polling or transmission interval a predetermined number of times, and thereafter simultaneously activating the pump station or pump stations of the group by the central controller while with the central controller delaying before repeating the group formation by at least a time required to empty the pump stations.

12. The method defined in claim 11, wherein the number of repetitions corresponds to the greatest multiple of the delay that is smaller than the polling interval or transmission interval.

13. A method of operating a pressurized wastewater-drainage system having interconnected line sections for conducting wastewater to a transfer station and a plurality of pump stations connected to the line sections for collecting the wastewater, the method comprising the steps of:
   transmitting from at least a portion of the pump stations status information indicating its respective pump standby status to a central controller,
   identifying the line section with which at least one pump station that is in standby is associated and that has the smallest diameter in comparison to the other line sections, with the group being formed from pump stations that are associated with this line section,
   forming a group from a set of pump stations that are in pump standby in relation to one of the line sections such that the number of pump stations of the group corresponds at least to a minimum number of pump stations associated with this line section, and
   then simultaneously activating the pump station or pump stations of the group by the central controller.

14. The method defined in claim 13, further comprising the steps of:
   assigning a line priority at least to line sections having the same diameter and, to form the group, in the case of several line sections having identical smallest diameters,
   using the line section to which the highest line priority is assigned.

15. The method defined in claim 13, further comprising the step of:
   assigning a pump priority to each pump station and, in the event that more pump stations that are in standby are associated with the identified line section that the maximum number indicates,
   forming the group from those pump stations that have the highest priorities.

16. The method defined in claim 15, further comprising the step of:
   assigning a higher priority to a pump station of a line section the farther away it lies in a flow direction from the downstream end of the respective line section.

17. The method defined in claim 13, further comprising the step of:
   associating the respective line priority with each of the line sections or
   associating the respective pump priority with each of the pump stations and
   storing the associated line or pump priority in the table or at least one of the tables.

18. The method defined in claim 13, further comprising the step, if fewer pump stations that are in standby are associated with the identified line section than the minimum number indicates, of:
   forming the group on the one hand from the pump station of the identified line section that are in standby and, on the other hand, from one or more pump stations of at least one upstream line section that are in standby such that the minimum number of the identified line section is reached or even exceeded.

* * * * *